United States Patent [19]

Klieves

[11] 4,029,119
[45] June 14, 1977

[54] VALVE AND VALVE SYSTEM

[76] Inventor: Hal Klieves, P. O. Box 5850, Pompano Beach, Fla. 33064

[22] Filed: Apr. 30, 1975

[21] Appl. No.: 573,095

[52] U.S. Cl. .......................... 137/119; 137/624.14
[51] Int. Cl.² ..................................... F16K 31/363
[58] Field of Search ........ 137/119, 624.14, 624.18; 239/66

[56] References Cited

UNITED STATES PATENTS

| | | | |
|---|---|---|---|
| 3,080,881 | 3/1963 | Stilwell et al. | 137/624.14 X |
| 3,147,770 | 9/1964 | Perlis | 239/66 X |
| 3,307,580 | 3/1967 | Alfieri et al. | 137/624.18 |
| 3,785,391 | 1/1974 | Miller | 137/119 |
| 3,845,777 | 11/1974 | Gilson | 137/119 |

*Primary Examiner*—William R. Cline

[57] ABSTRACT

A new and improved automatic valve having an inlet and two separate outlets for use in a fluid distribution system. The valve cycle automatically opens both outlets when fluid stops flowing into the inlet. Each time the fluid flows through the inlet the valve automatically and alternately opens one valve outlet and closes the other valve outlet. The valve cycling mechanism is alternately cocked into a positive first and second cocked position in order to open the previously closed valve outlet and to close the previously opened valve outlet during the next half cycle. When this valve is connected at each branching point in a fluid distribution system, the valve will cause cyclic distribution of fluid from the terminal branches of the system in a serial manner.

4 Claims, 16 Drawing Figures

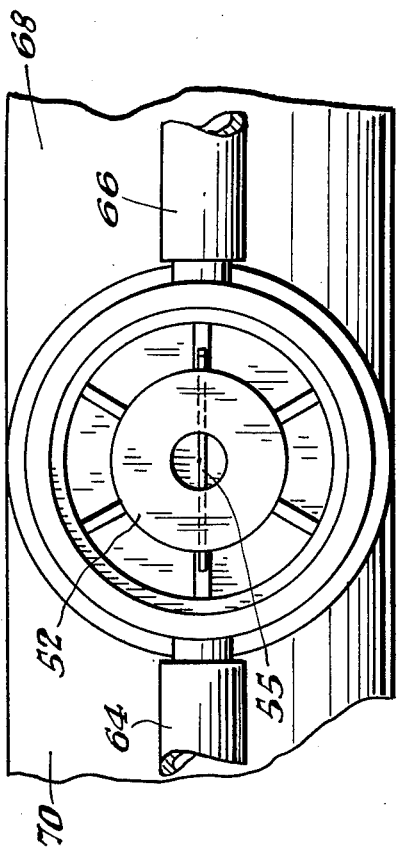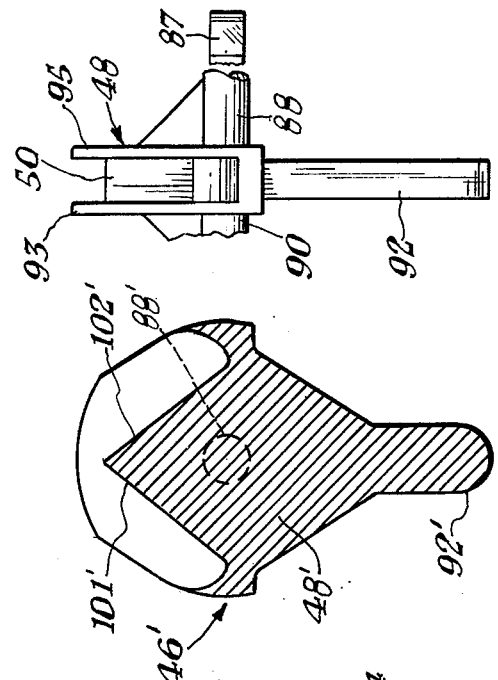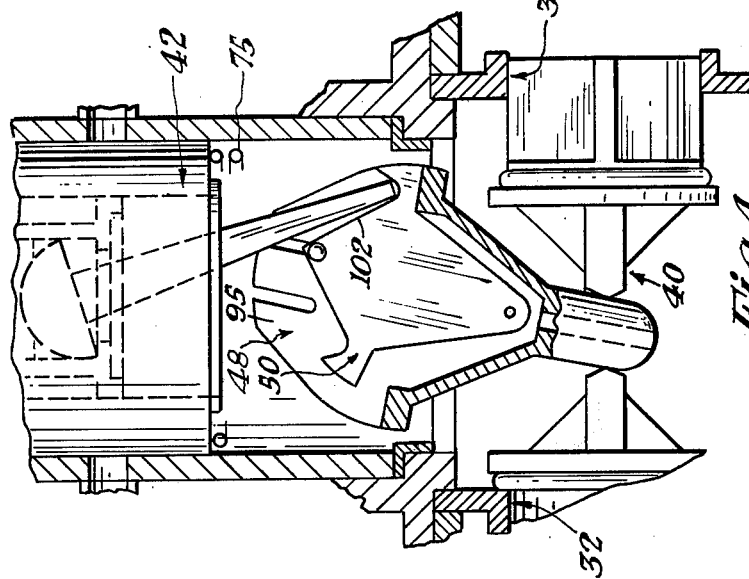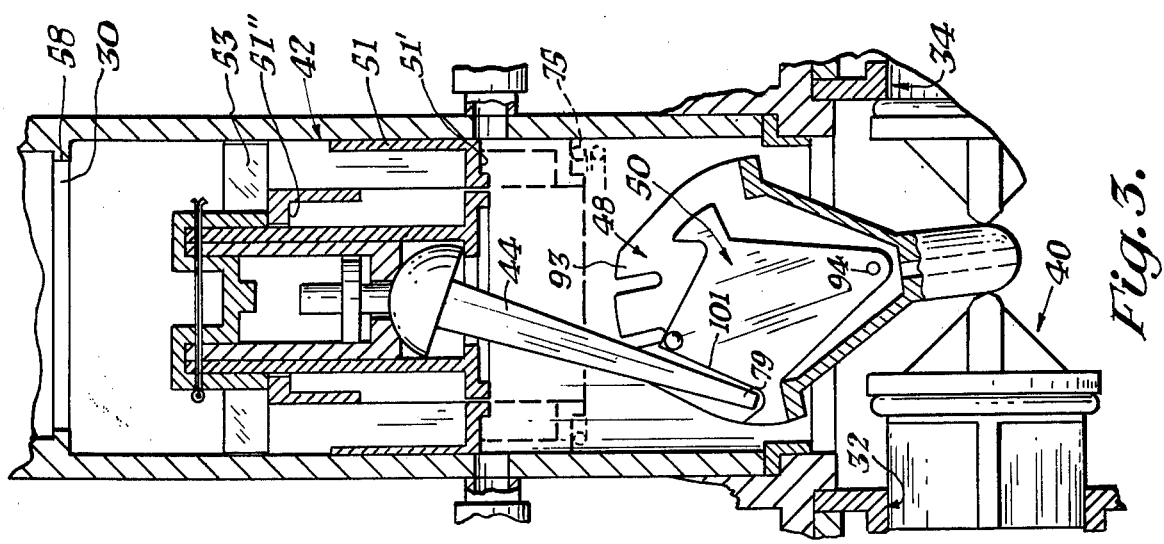

VALVE AND VALVE SYSTEM

BACKGROUND OF THE INVENTION

This invention relates to a new and improved automatic two-way valve and an automatic serial distribution system.

In the past valves of various types have been designed for use in distributing systems for irrigation purposes. As is perhaps well-known, many distribution systems have been designed for providing fluid flow output at each terminal end in the distribution systems. The new and improved automatic valve and automatic distribution system disclosed herein provides a non-complex, low-cost valve means and an improved cyclic distribution system that serially distributes fluid from a plurality of terminal branches in the system.

Brief Description of the Invention

The present invention relates to a new and improved automatic valve including an inlet and two separate outlets for use in a fluid distribution system. The valve includes a cycling mechanism to automatically open both outlets when fluid stops flowing into the inlet and alternately cocks the mechanism in a first or second cocked position for the next half cycle. When the fluid flows into the inlet of the valve and engages the cycling mechanism, the mechanism automatically fully opens one valve and closes the other valve. Alternately the first valve outlet is opened and the second valve outlet is closed; then on the next half cycle the first valve outlet is closed and the second valve outlet is opened. When the mechanism is positively cocked in position the previously closed valve outlet is partially opened and the previously opened valve outlet is partially closed at the end of each half of the cycle of the mechanism.

The valve is connected to each junction in a multi-branching fluid distribution system. The new and improved valve will cause cyclic distribution of fluid from each of the terminal branches of the system in a serial manner. Only the main valve need be actuated on and off to provide the serial distribution.

It is an object of this invention to provide a system of fluid distribution through a plurality of outlet nozzles in a serial manner by solely actuating the main distribution valve.

It is another object of this invention to provide an economic cycling mechanism for providing an output from either a first or second outlet. The cycling mechanism has four operating positions including a first cocked position with the first and second valve partially open and a first actuated position with the first valve opened and the second valve closed, and a second cocked position with the first and second valve open, and a second actuated position with the first valve closed and the second valve opened.

Another object of this invention is to provide a cycling mechanism including a pivotal arm device and a rocker cam mechanism providing four operating positions.

It is another object of this invention to provide a new and improved generally low-cost two-way valve that is automatically actuated by fluid flowing into the inlet.

Another object of this invention is to provide an automatic fluid flow actuated valve that automatically positions the actuating mechanism in positive position to fully open the first or second outlet.

An additional object of this invention is to provide a fluid flow actuated valve that alternately opens and closes the two outlets and places the two outlets in a partially open position when no fluid is flowing into the inlet.

A further object of this invention is to provide fluid bypass means past the valve seating means to prevent fluid lockup.

In accordance with these and other objects which will be apparent hereinafter, the instant invention will now be described with particular reference to the accompanying drawings illustrating the valve system and the valve.

BRIEF DESCRIPTION OF THE DRAWINGS

In the drawings:

FIG. 3 is a front partial cross sectional view of the valve with the cycling device in a first position after initial entry of a fluid past the drive means with the first, the left hand, valve outlet opened and the second, the right hand, valve outlet closed, and showing the outer member of the drive means in phantom in a fully opened position;

FIG. 4 is a front partial cross sectional view of a portion of the valve with the valve cycling device in a second position with the left hand valve outlet closed and the right hand valve outlet opened.

FIG. 5 is a top view of the valve;

FIG. 8 is a front cross sectional view of an embodiment of a single member cycling device;

FIG. 9 is a partial side view of the base of the cycling device with the cam of FIG. 7 in place in a cocked position;

DESCRIPTION OF A PREFERRED EMBODIMENT

Figure 1:
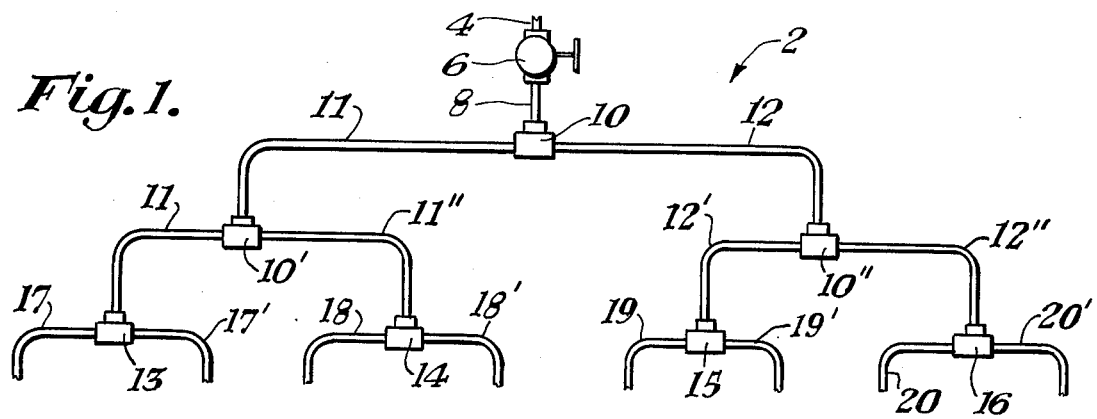
FIG. 1 is a plan view of the fluid distribution system including an automatic valve at each junction.

Referring now in detail to the drawings, wherein the preferred embodiment of the invention is shown and referring particularly to FIG. 1, the valve distribution system, generally designated by numeral 2 includes a main 4 connected to a main inlet valve 6 and a distribution system including a plurality of the new and improved valves. The distribution system may include a line 8 connected to valve 10 which is in turn connected at a branching point of lines 11 and 12. The branching lines 11 and 12 are in turn branched into additional lines through a valve 10' and 10". Each branching line from valves 10' and 10" are designated 11', 11" and 12', 12" respectively. The distribution system may again be branched into additional lines by valve 13, 14, 15 and 16. The terminal lines 17, 17', 18, 18', 19, 19', 20 and 20' distribute fluid for irrigation purposes. Each time the valve 6 is turned on and off the new and improved valve 10, 10', 10", 13, 14, 15 and 16 control the fluid in order to serially distribute fluid out of one of the terminal lines at a time. Upon completion of distribution from each of the terminal lines the cycle will automatically repeat the sequence of distribution from the terminal lines until the on-off actuation of valve 6 is terminated.

Figure 2:
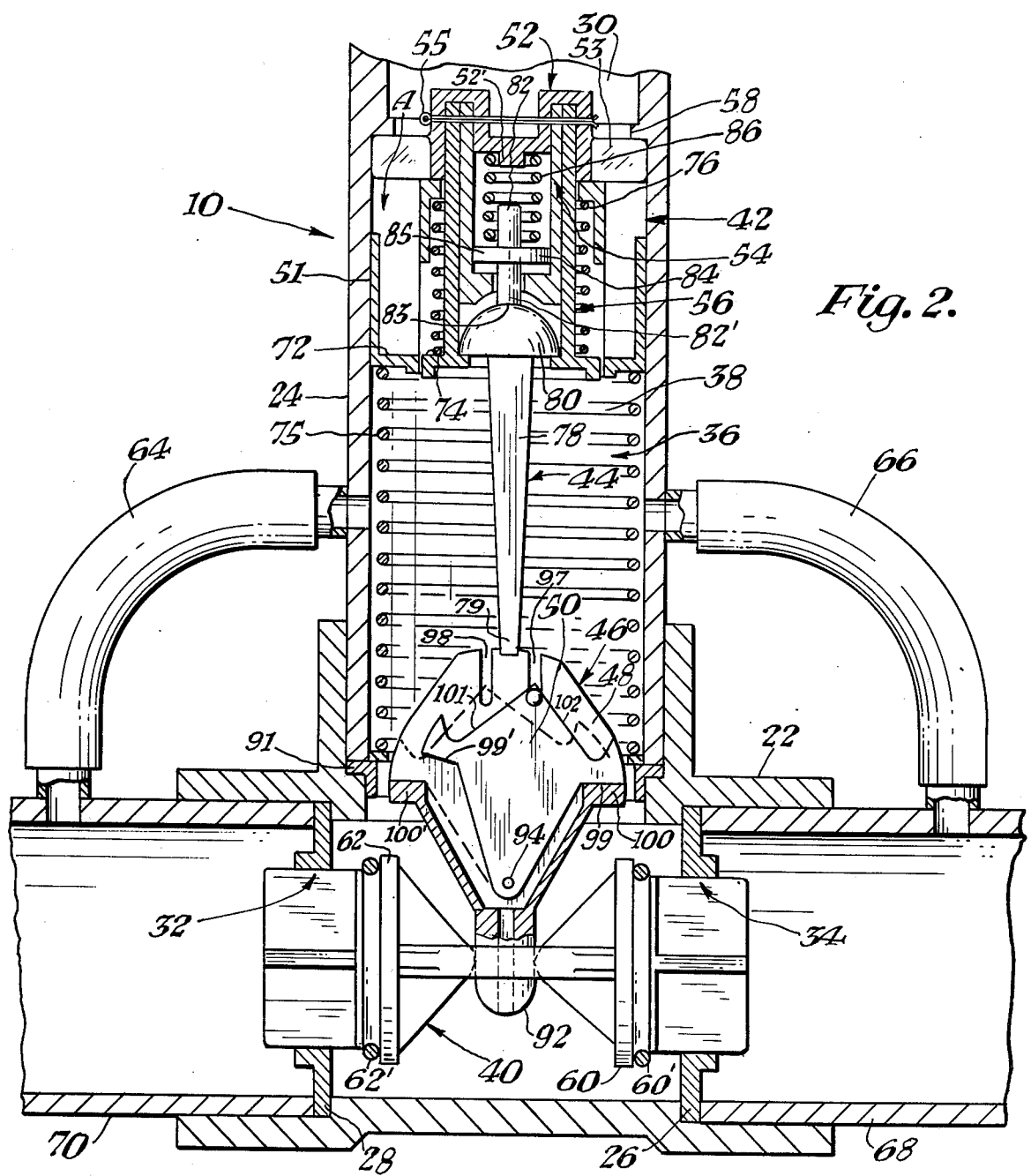
FIG. 2 is a front view cross section of the valve with the device in a neutral position but cocked to the right in the first cocked position with the valve means in a neutral opened position and the drive means in a closed position, and showing the cycling device in phantom in the second cocked position.

Referring now to FIG. 2 showing a cross-section of the new and improved valve 10, the valve includes body 22 with an upper body portion 24. The body 22 includes a first and second outlet wall 26 and 28 respectively. The body 22 has an inlet 30 in the upper body portion and two outlets 32 and 34 in the walls 28 and 26 respectively. Valve 10 also includes an automatic cycling mechanism generally designated by numeral 36. The cycling mechanism 36 lies between the inlet 30 and the outlets 32 and 34. The cycling mechanism is used to control the inlet fluid distribution by alternately opening and closing the first and second outlet. The cycling mechanism 36 in chamber 38 includes an actuating or piston mechanism 42 and a cycling drive means 44 and 46. The cycling drive means includes a drive arm 44 and cycling arm means 46. The actuating mechanism 42, a piston means, drives arm 44 into and out of contact with the cycling cam means 46 to actuate the valve means 40. The valve means includes a right hand valve closure gate 60 with gasket 60' and a left hand closure gate 62 with gasket 62'. The closure gates move into and out of contact with the walls 26 and 28. The valve 10 also includes two bypass means 64 and 66 connected between the upper body portion 24 and the conduits 68 and 70 downstream of the outlets 34 and 32.

Figure 15:
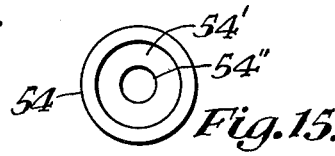
FIG. 15 is a top view of the inner drive arm guide member.
Figures 7, 12:
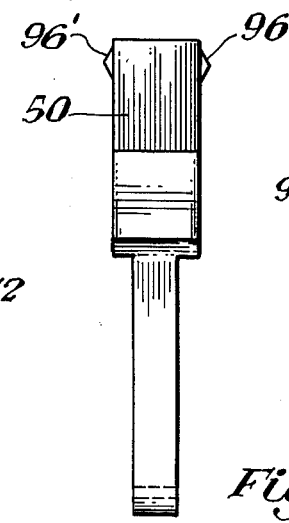
FIG. 7 is a side view of the moveable cam of the cycling device.
FIG. 12 is a top view of the outer piston member.

The actuating mechanism 42 is normally held in an upper position as shown in FIG. 2 by spring 75. The actuating mechanism 42 includes an outer piston member 51 shown in detail in FIG. 2 and also shown in FIG. 12, and a central cap member 52, also shown in FIG. 13, connected by pin 55 to an inner drive arm guide member 54, also shown in FIG. 15, and an intermediate member 56, as also shown in FIG. 14. The outer piston member 51, also shown in FIG. 12, is connected to the intermediate member 56 by spring 76 for relative movement.

When water flows through inlet 30 past the upper stop ring portion 58, fluid will flow downwardly as shown by arrow A in FIG. 2 against the base 72 of the outer piston member 51 and the surface 74 of the intermediate member 56. The entire actuating member 42 will move from the position shown in FIG. 2 to a lower position as shown in FIG. 3. The actuating mechanism 42 and the central cap member 52 with guide wings 53 will be spaced from the inlet 30 and the inlet stop ring portion 58. After the actuating member 42 reaches the position shown in FIG. 3, that is when the tip 79 of drive arm 44 bottoms in cam surface 101, the outer piston member 51 may move further downward into a position shown in phantom in FIG. 3 and is shown in FIG. 4. As the outer piston member 51 with portion 51' moving down against the force of return spring 75 and with portion 51" moving down against the force of the secondary return spring 76, fluid is allowed to flow past the actuating mechanism 42 and out through one of the outlets 32 and 34.

Figure 13:
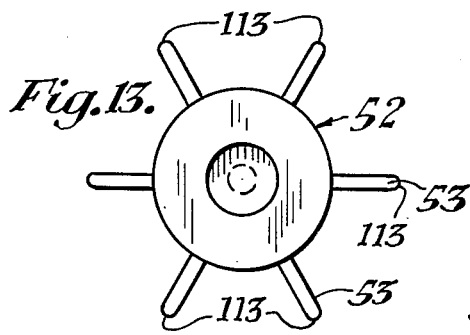
FIG. 13 is a top view of the central cap member.
Figure 14:
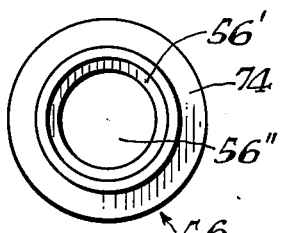
FIG. 14 is a top view of the intermediate member.

The inner portion of the actuating mechanism 42 includes a central cap member 52 shown in FIG. 13 with guide portions 53 that engage the ring 58 and the inside of the upper body portion 24. The inner drive arm guide means 54 shown in FIG. 15 includes a spring cavity 54' and a lower opening 54". The intermediate member 56 shown in FIG. 14 includes spring shelf surface 74, centering shelf 56' for arm 44, and opening 56". The members 52, 54 and 56 are held together by pin 55. The bottom of the central cap member 52 with spring positioning member 52' and the inner drive arm guide means 54 form a cavity that holds spring 86 and reciprocating centering member 84. The reciprocating centering member 85 has a cylindrical surface 85 to engage the inner wall of guide member 84. Projection 82 holds the lower end of spring 86 in place and projection 82' with a concave surface 83 contacts the bulbous end 80 of arm 44. The spring 86 and centering member 84 bias the arm 44 into the position shown in FIG. 2.

The actuating arm 44 includes an elongated arm member 78 having an upper bulbous end 80. The actuating arm is normally held in the position shown in FIG. 1 by projection 82' that moves up and down within the opening in the inner drive arm guide means 54. Spring 86 biases the projection 82' downwardly against the bulbous end 80 of the actuating means 44 to seat the edges of the bulbous end 80 on shelf 56'.

Figure 6:
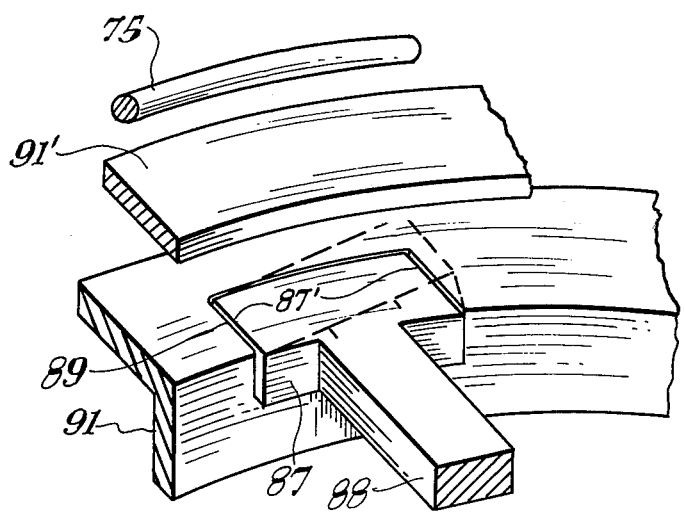
FIG. 6 is a partial isometric view of the cycling device spring means, retainer members, and a portion of the t-connector of the base of the cycling device shown in FIG. 9.
Figure 16:
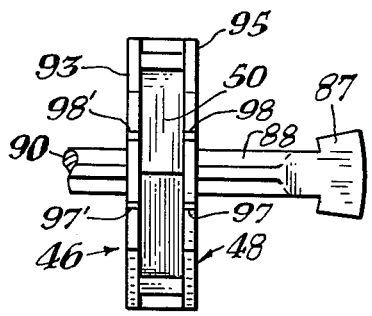
FIG. 16 is a top view of the cam member in base of the cycling device as shown in FIG. 9.

The cycling means 46 and in alternate cycling means 46' shown in FIG. 8 includes a base member 48 shown in FIGS. 9 and 16 and 48' in FIG. 8. Base member 48 includes a relatively moveable cam surface 50. Details of the base member 48 are shown in FIGS. 6, 9 and 16. The relatively moveable cam member 50 is shown in FIGS. 7, 9 and 16. The base member 48 is biased into its neutral position as shown in FIG. 2 by a spring mechanism shown in FIG. 6. The base member includes two support arms 88 and 90 shown in FIG. 9. Each support arm 88 and 90 includes a generally t-shaped end 87 that lies in a notch 89 in the channel ring 91 lying. Over the t-shaped end 87 of the base member 48 is a flat ring member 91'. Spring 75 biases the flat ring member 91' against t-shaped end 87. When the base member is rocked back and forth as shown in FIG. 2, 3 and 4, one end of the t-shaped end 87 will tend to rise as shown in phantom in FIG. 6. The spring member 75 will force the ring member 91' to reposition the t-shaped member of the base member 48 in a neutral position as shown in FIG. 2. Spring 75 will impart a force against one edge of the t-shaped end 87 as shown in FIG. 6 to force the arm 88 and arm 90 into its neutral position shown in FIG. 2.

The cam means 50 shown in FIG. 7, 9 and 16 is pivotally connected within the forward and rearward walls 93 and 95 of the base member 48. The cam means 50 is pivoted about pin 94. The cam means 50 is positioned in either of two positions shown in FIG. 2 with the holding means 96 and 96', a bulbous holding means in slots 97, 97' or 98'. Identical slots are in walls 93 and 95. The cam means 50 may be placed in a right-hand position as shown in FIG. 4 or in a left-hand position as shown in phantom in FIG. 3 when the holding means 96 and 96' is placed in the slots 97, 97', 98 or 98' respectively.

When the cam means is in the right-hand position as shown in FIG. 2, the base surface 99 is in contact with the shelf 100 of the base member. When the cam means is in its left-hand position as shown in phantom in FIG. 1, the supporting surface 99' is in contact with shelf means 100'.

Referring to FIG. 2, when the cam means 50 is in its right-hand position and water begins to flow through the inlet 30 as shown by arrow A, the actuating mechanism 42 will move into position shown in FIG. 3, driving the arm 44 down the cam surface 101 of the cam means 50 moving the cam means into its left-hand position and thereafter rotating the base member 48 and its t-shaped ends 87, one of which is not shown, against the spring biasing means 75 to drive the valve means 40 into the position shown in FIG. 3. In FIG. 3 opening 34 is closed by the valve means 40 and outlet 32 is open. When the water stops flowing in inlet 30, the actuating mechanism 42, the arm 44, the cycling cam means 46 and the valve means 40 move back to a neutral position as shown in FIG. 2.

Figure 10:
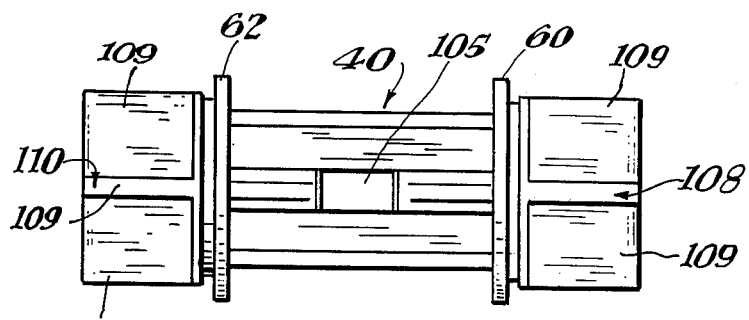
FIG. 10 is a top view of the valve member.
Figure 11:
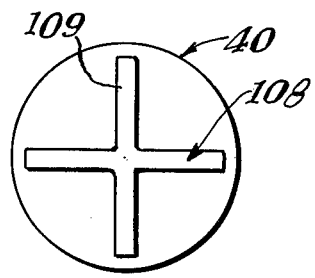
FIG. 11 is a side view of the valve member.

The next half-cycle begins when water is again allowed into the inlet 30. The water moves actuating mechanism 42 downward to move the arm 44 down against the cam surface 102. The arm 44 moves the cam member 50 into its right-hand position and to rotate the base member 48 to drive the valve means 40 to open the outlet 34 and close the outlet 32. The distal end of the base 92 fits into slot 105 in the valve means 40, see FIGS. 2, 10 and 11. Since base member 48 rotates 92 on the arm 88 and 90 it will drive the valve means 40 from a neutral position to the right or to the left in order to alternately open and close the outlets 32 and 34.

The valve means 40 includes circular plates 60 and 62 for closing the outlets 32 and 34. Extending out beyond the plates are guide means designated by numerals 108 and 110, with guide surfaces designated by numeral 109 for positioning and guiding the valve means in relationship to the outlet wall 26 and 28.

The actuating means includes the outer piston means 50 shown in FIGS. 2 and 12 with six guide means 112 having guide surfaces designated by numeral 111 for guiding engagement with the inner surface of wall 24. The guide surfaces 111 guide the movement of the outer piston means 50 as it reciprocates in the chamber 36. The central cap member 52 also includes six guide members 53 having guide surfaces designated by numeral 113, also see FIG. 13. The guiding surfaces 113 engage the inside surface of wall 24 and the ring member 58.

An alternate cycling cam means 48' or cycling drive means having a single member is shown in FIG. 8. The alternate cycling mechanism 48' has a valve actuating end 92', cam surfaces 101 and 102' and with a forward and aft support arm as illustrated by dotted lines marked 88'. Arms 88' are similar to arms 88 and 90 of base member 48. This mechanism would be driven by the drive arm 44 to actuate the valve means. This cycling cam means 48' is placed in a cocked position, off center by spring 75 and member 91'. The edges 87' and 87" of the shaped end 87 are cut or shaved, not shown, so that the cycling cam means would not be completely returned to an upright neutral position, as cycling cam means or cycling drive means 46 in FIG. 2. Therefore the drive arm 44 will engage the opposite cam surface 101' or 102' upon the next half cycle.

The instant invention has been shown and described herein in what is considered to be the most practical and preferred embodiment. It is recognized, however, that departures may be made therefrom within the scope of the invention and that obvious modifications will occur to a person skilled in the art.

What is claimed is:
1. An automatic valve comprising;
   a body including
      a fluid inlet for receiving incoming fluid,
      an intermediate portion connected to said fluid inlet and,
      two separate fluid outlets connected to said intermediate portion for alternately distributing the fluid, each of said outlets including valve seats,
   a fluid control mechanism connected in said intermediate portion, said fluid control mechanism including
      an actuating means connected in said inlet and reciprocally moveable during each cycle of incoming fluid that enters said inlet, the incoming fluid cycle begins with the initial entry of fluid, continues through the fluid flow, and ends with the termination of the fluid flow into said inlet, and
      a cycling means connected to said actuating means and driven through one half of the distribution cycle by said actuating means during each incoming fluid cycle,
      a drive arm connected between said actuating means and said cycling means,
      a moveable valve gating means connected in said body in a normally neutral position with both outlets open, said valve gating means connected to said cycling drive means and driven by said cycling drive means for movement of said valve gating means alternately into and out of engagement with said valve seats to open one fluid outlet and close the other fluid outlet during the first half cycle, and to close the second outlet and open the first outlet during the second half cycle, said cycling means includes
      a cam means and a pivotable base member for relative movement between said cam means and said base member, said drive arm contacts said cam means to drive said base member for driving said valve gating means from a neutral position to open one outlet and close the other outlet and to cock said cam means into another position to receive said drive arm from the neutral position to drive said base member during the next half-cycle, said cycling means includes a biasing means to move said base member and said valve gating means back into a neutral position.
2. An automatic valve comprising:
   a body including
      a fluid inlet for receiving incoming fluid,
      an intermediate portion connected to said fluid inlet and,
      two separate fluid outlets connected to said intermediate portion for alternately distributing the fluid, each of said outlets including valve seats,
   a moveable valve gating means connected in said body in a normally neutral position with both outlets open, said valve gating means moveable to alternately come into contact with one of said valve seats to open one fluid outlet and close the other fluid outlet during the first half cycle, and to close the one fluid outlet and open the other fluid outlet during the second half cycle, a cycling mechanism including an actuating means moveably connected in said body in said inlet and a cycling drive means driven by and connected to said actuating means, said cycling means connected to said valve gating means to alternately move said valve gating means;

said actuating means including piston means driven in a first direction by the fluid entering said inlet, said piston means reciprocally moveable from a first position to another position to drive said cycling drive means, said piston means included a biasing means to return said piston to its first position when no fluid is flowing in said inlet, said cycling drive means connected to said valve means to alternately open one outlet and close the other outlet and thereafter close said one outlet and open said other outlet, said cycling drive means includes a cockable device connected to said actuating means positionable in a first cocked position during the first half-cycle to move said valve gating means from a neutral position to a first position with one of said outlets open and the other outlet closed upon entry of the fluid in said inlet and to return said valve means to a neutral position with both said outlets open when the fluid no longer flows through said inlet and to cock said cockable mechanism in a second position for moving said valve means during the second half-cycle from the neutral position to a second position with said one of said outlets closed and said other outlet open when fluid again flows through said inlet, and for returning said valve means to the neutral position when fluid no longer flows through said inlet.

3. An automatic valve as set forth in claim 2 including;

a drive arm moveably connected to said actuating mechanism for movement with said actuating mechanism, said drive arm moveable relative to said actuating mechanism to drive said cockable mechanism into said first or second position, said cockable device having engaging surfaces for engagement by said drive arm, said cycling means including a base member connected to said valve means, said base member moveably connected to said body and including a biasing means to bias said base member into a neutral position.

4. An automatic valve system comprising;

a main for supplying fluid to the system, a main valve means including means to shut off said main valve, said main valve means including an inlet connected to said main and an outlet for starting and stopping the flow of fluid into the downstream system, a first outlet conduit with one end connected to said main valve outlet, a first automatic valve having an inlet and two outlets, said first automatic valve inlet connected to the other end of said first outlet conduit, a second outlet conduit with one end connected to one outlet of said first automatic valve, a third outlet conduit having one end connected to the other outlet of said first automatic valve, a second and third automatic valve identical to said first automatic valve, the inlet of said second automatic valve connected to the other end of said second outlet conduit, the inlet of said third automatic valve connected to the other end of said third outlet conduit, said automatic valve including, a body including
  a fluid inlet for receiving incoming fluid,
  an intermediate portion connected to said fluid inlet and,
  two separate fluid outlets connected to said intermediate portion for alternately distributing the fluid, each of said outlets including valve seats, a fluid control mechanism connected in said intermediate portion, said fluid control mechanism including
  an actuating means connected in said inlet and reciprocally moveable during each cycle of incoming fluid that enters said inlet, the incoming fluid cycle begins with the initial entry of fluid, continues through the fluid flow, and ends with the termination of the fluid flow into said inlet, and
  a cycling means connected to said actuating means and driven through one half of the distribution cycle by said actuating means during each incoming fluid cycle,
  a drive arm connected between said actuating means and said cycling means, a moveable valve gating means connected in said body in a normally neutral position with both outlets open, said valve gating means connected to said cycling drive means and driven by said cycling drive means for movement of said valve gating means alternately into and out of engagement with said valve seats to open one fluid outlet and close the other fluid outlet during the first half cycle, and to close the second outlet and open the first outlet during the second half cycle, said cycling means includes
  a cam means and a pivotable base member for relative movement between said cam means and said base member, said drive arm contacts said cam means to drive said base member for driving said valve gating means from a neutral position to open one outlet and close the other outlet and to cock said cam means into another position to receive said drive arm from the neutral position to drive said base member during the next half-cycle, said cycling means includes a biasing means to move said base member and said valve gating means back into a neutral position.

* * * * *